(12) United States Patent
Sakai

(10) Patent No.: US 10,394,014 B2
(45) Date of Patent: Aug. 27, 2019

(54) INTEGRATED BLACK MATRIX INCLUDING COLOR FILTER MATERIALS

(71) Applicant: AMAZON TECHNOLOGIES, INC., Seattle, WA (US)

(72) Inventor: Toru Sakai, Waalre (NL)

(73) Assignee: Amazon Technologies, Inc., Seattle, WA (US)

( * ) Notice: Subject to any disclaimer, the term of this patent is extended or adjusted under 35 U.S.C. 154(b) by 66 days.

(21) Appl. No.: 15/077,643

(22) Filed: Mar. 22, 2016

(65) Prior Publication Data

US 2017/0276928 A1    Sep. 28, 2017

(51) Int. Cl.

| G02B 26/00 | (2006.01) |
|---|---|
| G02F 1/03 | (2006.01) |
| G02F 1/07 | (2006.01) |
| G02B 5/20 | (2006.01) |
| G02F 1/1335 | (2006.01) |
| G02B 5/22 | (2006.01) |

(52) U.S. Cl.
CPC ............ *G02B 26/005* (2013.01); *G02B 5/201* (2013.01); *G02B 5/223* (2013.01); *G02F 1/133512* (2013.01); *G02F 2001/133519* (2013.01)

(58) Field of Classification Search
CPC ......... G02F 1/133512; G02F 1/133514; G02F 1/133516; G02F 2001/133388; G02F 1/136209; G02F 2001/136222; G02F 1/133603; G02F 1/133609; G02F 1/133617; G02F 1/13394; G02F 2001/13398; G02F 2202/36; G02F 1/133345; G02F 1/134309; G02F 1/13439

USPC ........ 359/237, 242, 265–267, 290–292, 295, 359/298, 321, 322

See application file for complete search history.

(56) References Cited

U.S. PATENT DOCUMENTS

| 5,680,187 A | 10/1997 | Nagayama et al. | |
|---|---|---|---|
| 5,880,799 A * | 3/1999 | Inoue ................ | G02F 1/133512 349/110 |
| 6,525,791 B1 | 2/2003 | Tsuda et al. | |
| 8,120,732 B2 * | 2/2012 | Nishida ............. | G02F 1/133514 349/106 |
| 8,284,352 B2 * | 10/2012 | Chae ................ | G02F 1/133516 349/106 |

(Continued)

FOREIGN PATENT DOCUMENTS

| JP | 2009 047822 A | 3/2009 |
|---|---|---|
| KR | 2012 0045884 A | 5/2012 |

OTHER PUBLICATIONS

International Search Report and Written Opinion from related PCT application No. PCT/US2017/022094, dated Jul. 31, 2017, 16 pgs.

*Primary Examiner* — Brandi N Thomas
(74) *Attorney, Agent, or Firm* — EIP US LLP

(57) ABSTRACT

A display device includes a bottom support plate and an opposing top support plate. A pixel region is between the bottom support plate and the top support plate. A color filter layer on an inner surface of the top support plate includes a plurality of color filters, wherein a first color filter of the plurality of color filters is positioned within the pixel region. A black matrix member is disposed between the first color filter and an adjacent second color filter of the plurality of color filters. A portion of the first color filter is disposed over the black matrix material and a portion of the second color filter is disposed over the portion of the first color filter.

20 Claims, 6 Drawing Sheets

(56) References Cited

U.S. PATENT DOCUMENTS

| | | |
|---|---|---|
| 2004/0090582 A1 | 5/2004 | Ikeda et al. |
| 2006/0001802 A1* | 1/2006 | Kao .................. G02F 1/133512 349/106 |
| 2007/0064188 A1 | 3/2007 | Okamoto |
| 2012/0147303 A1* | 6/2012 | Yamada ................... G02B 1/11 349/96 |
| 2013/0250396 A1* | 9/2013 | Kim ..................... G02B 26/005 359/290 |
| 2013/0342889 A1 | 12/2013 | Kim et al. |
| 2014/0293199 A1 | 10/2014 | Sakae et al. |
| 2016/0377901 A1* | 12/2016 | Yen ..................... G02F 1/13394 359/891 |

\* cited by examiner

INTEGRATED BLACK MATRIX INCLUDING COLOR FILTER MATERIALS

BACKGROUND

Electronic displays are found in numerous types of electronic devices including, without limitation, electronic book ("eBook") readers, mobile phones, laptop computers, desktop computers, televisions, appliances, automotive electronics, and augmented reality devices. Electronic displays may present various types of information, such as user interfaces, device operational status, digital content items, and the like, depending on the type and the purpose of the associated electronic device. The appearance and the quality of a display may affect a user's experience with the electronic device and the content presented thereon. Accordingly, enhancing user experience and satisfaction continues to be a priority.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1:
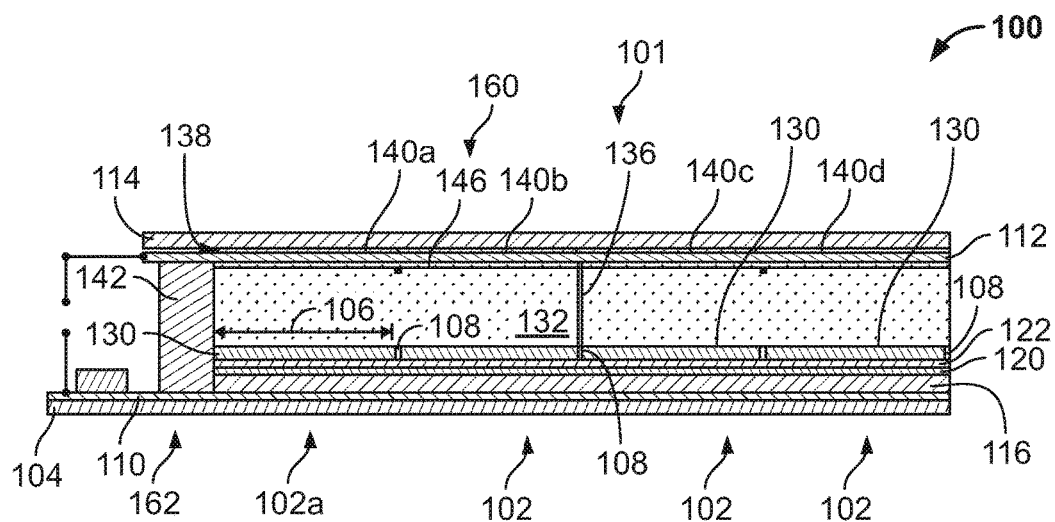
FIG. 1 is a cross-sectional view of an example electrowetting display device, according to various embodiments.

In embodiments described herein, an electrowetting display device includes a color filter layer on an inner surface of a top support plate. The color filter layer includes a plurality of color filters, e.g., a pattern of red, green, and white or transparent color filters, and a black matrix material, e.g., one or more black matrix members, forming a boundary or a border of each color filter. The black matrix material is directly over pixel walls forming an electrowetting pixel within an electrowetting pixel region. In example embodiments, a black matrix member is directly over a corresponding pixel wall forming at least a portion of a corresponding electrowetting pixel within an electrowetting pixel region. A color stack including a first color filter material, e.g., a red photoresist material, and a second color filter material, e.g., a blue photoresist material, is formed on the black matrix material to increase an optical density of the black matrix stack to prevent or limit harmful light rays from impinging on an electrode layer, e.g., a TFT, positioned under the respective pixel wall. In example embodiments, the optical density of the integrated black matrix is increased, while maintaining a suitable reflectance level of the black matrix.

As a non-limiting example, in a particular embodiment, an electrowetting display device includes a color filter layer on an inner surface of the top support plate. The color filter layer is positioned within an electrowetting pixel region and includes a color filter, e.g., a red, green, blue or white or transparent color filter, and a black matrix material forming a boundary or border around at least a portion of the color filter. The black matrix material is positioned directly over the plurality of pixel walls forming a respective electrowetting pixel within the electrowetting pixel region. A color stack including a red color material and a blue color material is formed on the black matrix material.

More specifically, the electrowetting display device includes a first or bottom support plate and an opposing second or top support plate. An electrowetting pixel region is between the first support plate and the second support plate. A plurality of pixel walls are formed over the first support plate, e.g., on or over an electrode layer. In this embodiment, the plurality of pixel walls is associated with an electrowetting pixel within the electrowetting pixel region. A color filter layer is formed between the first support plate and the second support plate, e.g., deposited on an inner surface of the second support plate within the electrowetting pixel region, such that the color filter layer is positioned over the plurality of pixel walls. The color filter layer includes a color filter positioned directly over the electrowetting pixel and a black matrix material forming a boundary or border around at least a portion of the color filter. The black matrix material is aligned with and positioned directly over the plurality of pixel walls associated with the electrowetting pixel.

A color stack is formed, e.g., deposited, on the black matrix material. The color stack includes, for example, a first color material deposited on the black matrix material and a second color material deposited on the first color material. In example embodiments, the first color material and the second color material are the same or similar to the materials of the red color filter and the blue color filter, respectively, and are made of the same or similar materials. For example, the first color material includes a red photoresist material and the second color material includes a blue photoresist material. In an alternative example embodiment, the first color material includes a blue photoresist material and the second color material includes a red photoresist material. In a particular embodiment, at a wavelength of 550 nanometers to 650 nanometers, for example, the black matrix material has an optical density greater than 2.0 and the color stack has an optical density greater than 1.0. As a result, the integrated black matrix, i.e., a combination of the black matrix and the color stack, has an optical density greater than 3.0 and, more particularly, 3.5 or greater.

In electrowetting display devices described herein, a color filter layer is positioned under a top support plate. The color filter layer includes a patterned black matrix forming a boundary around or bordering the color filters, e.g., the red, green, blue, and white color filters in an RGBW display. The black matrix is formed of a suitable photoresist material including a black pigment (e.g., a carbon black color pigment) that is formed over the transparent pixel walls to absorb light entering the electrowetting display device and prevent or limit the light from impinging on the electric components, e.g., one or more thin film transistors (TFTs), positioned under the transparent pixel walls. The reflectance of the black matrix may be adjusted by adjusting an amount of pigment in the black matrix. For example, reducing the amount of pigment in the black matrix will lower the reflectance of the black matrix; however, the absorption or optical density of the black matrix, determined by the concentration of pigment in the black matrix, may be negatively affected and the black matrix may appear gray. To increase a contrast ratio (i.e., a contrast of white to black) in the display, a reflectance of the black matrix is decreased in the color filter layer, while maintaining the absorption level or optical density at a suitable level. An overcoat layer, e.g., a planarization layer, is applied over the color filter layer to protect the color filter material from electrolyte solution contained within a pixel region between the top support plate and the bottom support plate. In certain embodiments, the overcoat layer includes a transparent planarization layer that provides a smooth, planar surface on the color filter layer. An ITO layer is applied or deposited on the overcoat layer to form a common electrode, as discussed in greater detail below. One or more spacers are then coupled to, e.g., formed on, the ITO layer or an outer surface of the common electrode.

In example embodiments, a combination of the black matrix and the color stack, referred to as an integrated black matrix, has an optical density greater than 3.0, and, more specifically, an optical density 3.5 or greater. The optical density is logarithmic. With an optical density of 3.0, for example, less than 0.1% of light impinging on the black matrix will penetrate and propagate through the integrated black matrix, i.e., the black matrix and the color stack, to impinge on the pixel wall positioned under the black matrix, and with an optical density of 4.0, less than 0.01% of light impinging on the black matrix will penetrate and propagate through the integrated black matrix to impinge on the pixel wall positioned under the black matrix. In example embodiments disclosed herein, a low reflective black matrix is realized by decreasing a concentration of pigment within the black matrix. In certain embodiments, the optical density of the black matrix will be relatively low, e.g., typically, less than 2.0 at a thickness of 1.0 micrometer. To reduce the penetration or propagation of light through the black matrix, one or more color materials, e.g., a blue photoresist material and/or a red photoresist material, are positioned on, e.g., applied to, a surface of the black matrix. In the example embodiment, the color materials are located between the black matrix and the overcoat layer applied to the color filter layer to increase the optical density of the integrated black matrix. In certain embodiments, the color material is made of a suitable photoresist material with a color pigment. As a result, an optical density of the integrated black matrix is greater than 3.0, which reduces an amount of light propagating through the associated pixel region.

The black matrix functions to block penetration of light in a pixel region and to minimize an amount of stray light in the pixel region. The optical density of black matrix (i.e., the logarithmic of transmittance) is increased by increasing a concentration of black pigment in the base material, which results in an increased refractive index of the black matrix. In order to lower the reflectance of the black matrix, on the other hand, the refractive index of the black matrix is decreased. However, the concentration of pigments in the black matrix should be maintained above a certain level, otherwise a thickness of the black matrix is too thick (due to a low optical density) and the pattern definition of the black matrix is not controllable.

The optical density spectrum of the overlapped color stack, e.g., red color material and blue color material, exceeds 1.0 at wavelengths of about 550 nanometers to about 650 nanometers. Because the color stack is lying under the black matrix having an optical density greater than 2.0, the total optical density of the integrated black matrix to the penetrated light is greater than 3.0, which is sufficient to reduce an amount of stray light in the pixel region.

In certain embodiments, a pixel region may include a pixel or a pixel having two or more sub-pixels of a display device. Such pixels or sub-pixels may be the smallest light transmissive, reflective or transflective unit of a display that is individually operable to directly control an amount of light transmission through or reflection from the pixel region. For example, in some embodiments, a pixel may include a red sub-pixel, a green sub-pixel, a blue sub-pixel, and a white sub-pixel for RGBW displays. In other embodiments, a pixel may be a smallest component, e.g., the pixel does not include any sub-pixels.

In various embodiments described herein, electronic devices include electrowetting displays for presenting content. In some examples, the electronic devices may include one or more components associated with the electrowetting display, such as a touch sensor component layered atop the electrowetting display for detecting touch inputs, a front light and/or a back light component for lighting the electrowetting display, and/or a cover layer component, which may include anti-glare properties, anti-reflective properties, anti-fingerprint properties, and/or anti-cracking properties, for example.

In certain embodiments, an electrowetting pixel region includes an electrowetting pixel defined by one or more pixel walls that surround or are otherwise associated with at least a portion of the electrowetting pixel. The pixel walls form a structure that is configured to contain at least a portion of a first fluid, e.g., a liquid such as an opaque oil. Light transmission through the electrowetting pixel is controlled by the application of an electric potential to the electrowetting pixel, which results in a movement of a second fluid, e.g., a liquid such as an electrolyte solution, into the electrowetting pixel, thereby displacing the first fluid within the electrowetting pixel.

When the electrowetting pixel is in an off state (i.e., with no electric potential applied), the first liquid, e.g., the opaque oil, is distributed throughout the electrowetting pixel to substantially cover a display surface area of the electrowetting pixel. The first liquid absorbs light and the electrowetting pixel in this condition appears black in one embodiment. But when the electric potential is applied, the electrowetting pixel is in an on state and the first liquid is displaced to one or more sides of the electrowetting pixel, for example. Light can then enter the electrowetting pixel and impinge upon a surface of a reflective layer or a surface of the electrode layer, positioned at or near a bottom surface of the electrowetting pixel. The light is then reflected by the reflective layer or the surface of the electrode layer to reflect out of the electrowetting pixel. If the reflective surfaces reflect only a portion of the light spectrum or if color filters are incorporated into the electrowetting pixel structure, the electrowetting pixel may appear to have color.

A display device, such as an electrowetting display device, may include a transmissive, reflective or transflective display that generally includes an array of pixels (e.g., which may comprise sub-pixels) configured to be operated by an active matrix addressing scheme. For example, rows and columns of electrowetting pixels are operated by controlling voltage levels on a plurality of source lines and gate lines. In this fashion, the display device may produce an image by selecting particular pixels to transmit, reflect or block light. Pixels are addressed (e.g., selected) via rows and columns of the source lines and the gate lines that are electrically connected to transistors (e.g., used as switches) included in each pixel region. Transistors occupy a relatively small fraction of the area of each pixel region to allow light to efficiently pass through (or reflect from) the pixel.

The array of pixels is sandwiched between two support plates, such as a first, e.g., bottom, support plate and an opposing second, e.g., top, support plate. For example, a bottom support plate in cooperation with a top support plate may contain pixel regions that include an oil, an electrolyte solution and pixel walls between the support plates forming associated pixels within a respective pixel region. The support plates may be made of any suitable material including, without limitation, plastic, glass, quartz, and semiconducting materials, and may be made of a rigid material or a flexible material, for example. The pixel regions include various layers of materials built upon the bottom support plate, e.g., within or under the pixels. One example layer is an amorphous fluoropolymer (AF1600®) with hydrophobic behavior. The pixel walls may be formed on a top surface of the hydrophobic layer. The bottom support plate may be opaque while the top support plate is transparent. Describing a component or material as being "transparent" generally means that the component or the material may transmit a relatively large fraction of the light incident upon it. For example, a transparent material or layer might transmit more than 70% or 80% of the light impinging on its surface, although in other examples a transparent material or structure might transmit a different percentage of incident light. In general, transparent materials or structures need not be perfectly transparent.

Hereinafter, example embodiments include, but are not limited to, reflective electrowetting displays having a clear or transparent top support plate and a bottom support plate, which need not be transparent. In general, "top" and "bottom" may be used to identify opposing support plates of an electrowetting display and do not necessarily refer to a direction referenced to gravity or to a viewing side of the electrowetting display device. In example embodiments, the top support plate is the surface through which pixels of a (reflective) electrowetting display are viewed.

As described above, individual reflective electrowetting pixels may include an electrode layer containing the drive electronics like TFTs, source lines, and gate lines on the bottom support plate, a reflective layer adjacent to or on the electrode layer, a pixel electrode adjacent to the reflective layer, a barrier layer on the reflective layer, and a hydrophobic layer on the barrier layer. In certain embodiments, the reflective layer itself can act as the pixel electrode. The pixel electrode in principle is close to the liquids in the pixel to minimize power consumption. In an alternative embodiment, the pixel electrode is under the reflective layer. The electrode layer as shown in FIGS. 1, 2, 4, and 5 can be an electrode layer containing at least part of the drive electronics if the reflective layer is used as the electrode or the electrode layer can contain the pixel electrodes in contact with the reflective layer. Pixel walls of each pixel, the hydrophobic layer, and the transparent top support plate at least partially enclose a liquid region within the cavity that contains the first liquid which is electrically non-conductive, e.g., an opaque oil retained in the individual electrowetting pixels by pixel walls, and the second liquid, e.g., an electrolyte solution, that is electrically conductive or polar and may be a water or a salt solution, such as a solution of potassium chloride in water. The second liquid may be transparent, but may be colored, or light-absorbing. The second liquid is immiscible with the first liquid. In general, substances are "immiscible" with one another if the substances do not substantially form a solution, although in a particular embodiment the second liquid might not be perfectly immiscible with the first liquid. In general, an "opaque" liquid is a liquid that appears black to an observer. For example, an opaque liquid strongly absorbs a broad spectrum of wavelengths (e.g., including those of red, green and blue light) in the visible region of electromagnetic radiation appearing black. However, in certain embodiments an opaque liquid may absorb a relatively narrower spectrum of wavelengths in the visible region of electromagnetic radiation and may not appear perfectly black.

In some embodiments, the opaque liquid is a nonpolar electrowetting oil. In certain embodiments, the first liquid may absorb at least a portion of the visible light spectrum. The first liquid may be transmissive for a portion of the visible light spectrum, forming a color filter. For this purpose, the first liquid may be colored by addition of pigment particles or a dye. Alternatively, the first liquid may be black, for example by absorbing substantially all portions of the visible light spectrum.

Spacers and edge seals mechanically couple the first support plate with the overlying, opposing second support plate, forming a separation between the first support plate and the second support plate, and contributing to the mechanical integrity of the electrowetting display device. Spacers can be at least partially transparent so as to not hinder throughput of light in the electrowetting display. The transparency of spacers may at least partially depend on the refractive index of the spacer material, which can be similar to or the same as the refractive indices of surrounding media. Spacers may also be chemically inert to surrounding media. Edge seals, for example, disposed along a periphery of an array of electrowetting pixels, may contribute to retaining liquids (e.g., the first liquid and the second liquid) between the first support plate and the overlying second support plate.

In some embodiments, the electrowetting display device as described herein may be incorporated into a system that includes one or more processors and one or more computer memories, which may reside on a control board, for example. Display software may be stored on the one or more memories and may be operable with the one or more processors to modulate light that is received from an outside source (e.g., ambient room light) or out-coupled from a lightguide of the electrowetting display device. For example, display software may include code executable by a processor to modulate optical properties of individual pixels of the electrowetting display device based at least in part on electronic signals representative of static image and/or video data. The code may cause the processor to modulate the optical properties of pixels by controlling electrical signals (e.g., voltages, currents, and fields) on, over, and/or in layers of the electrowetting display device.

Figure 2:
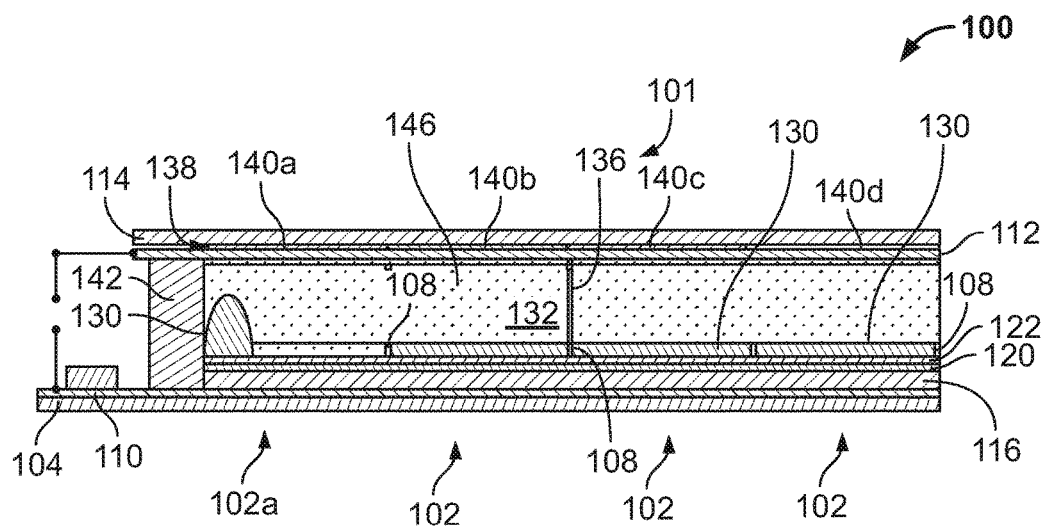
FIG. 2 is a cross-sectional view of the electrowetting display device of FIG. 1 with a first pixel activated, according to various embodiments.
Figure 3:
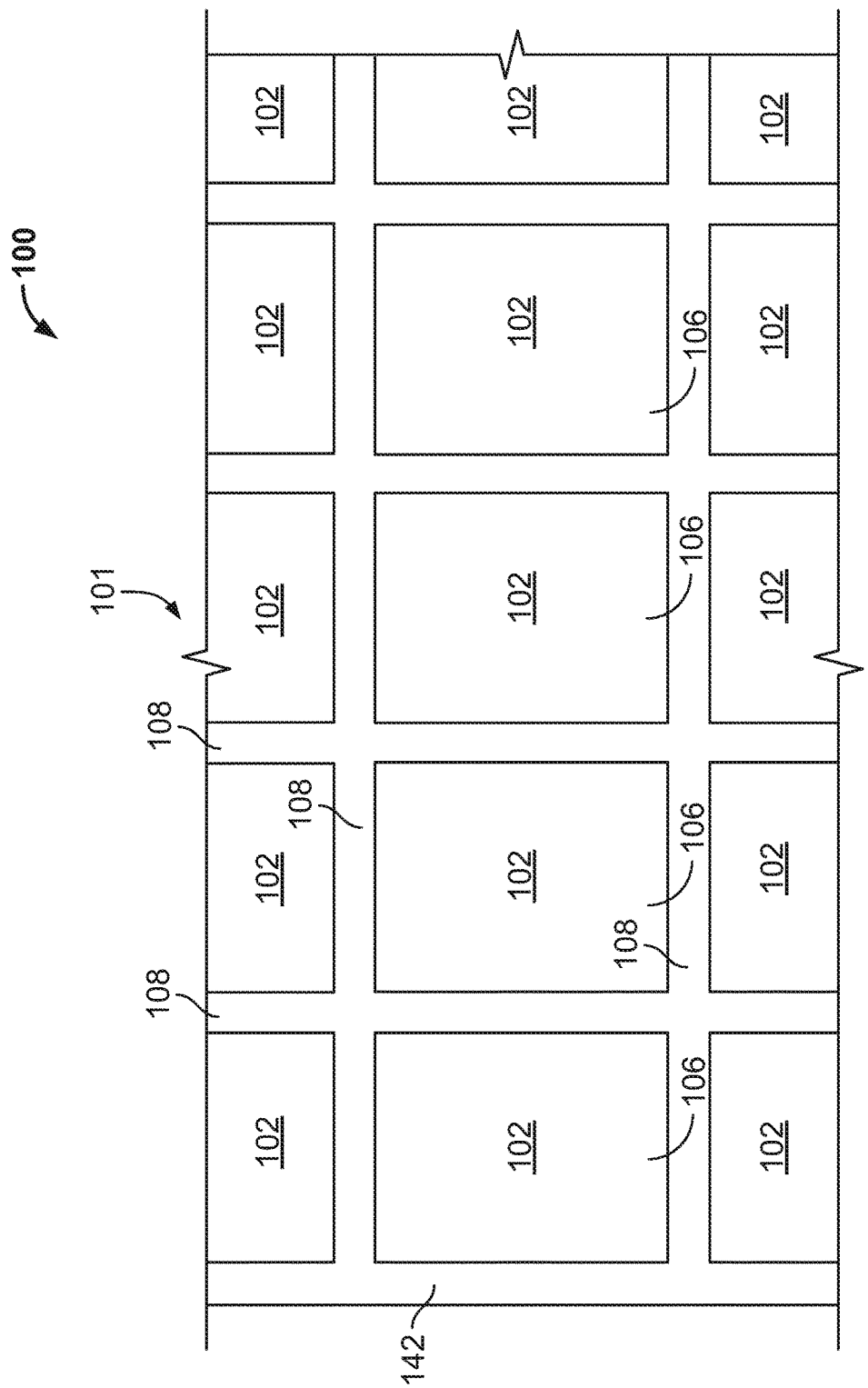
FIG. 3 is a top view of a plurality of electrowetting pixels of an example electrowetting display device, according to various embodiments.

Referring now to the figures, FIG. 1 is a cross-sectional view of a portion of an example reflective electrowetting display device 100 including a pixel grid 101 with several electrowetting pixel regions each including an electrowetting pixel 102. FIG. 2 shows the same cross-sectional view as FIG. 1 in which an electric potential has been applied to one electrowetting pixel 102*a* causing displacement of a first liquid disposed in electrowetting pixel 102*a*, as described below. Four complete electrowetting pixels 102 are shown in cross-section in FIGS. 1 and 2. FIG. 3 is a top view of an example reflective electrowetting display device 100 including pixel grid 101 having a plurality of electrowetting pixels 102 formed over a first or bottom support plate 104 (shown in FIGS. 1 and 2). As shown in FIG. 3, each electrowetting pixel 102 defines a display surface area 106. More specifically, in this embodiment, display surface area 106 is defined by pixel walls 108, as described below, having a first dimension, such as a width, between opposing lateral pixel walls 108, and a second dimension, such as a length, between the remaining opposing pixel walls 108. Electrowetting display device 100 may include any number (usually a very large number, such as thousands or millions) of electrowetting pixels 102.

Referring further to FIGS. 1 and 2, an electrode layer 110 having a plurality of pixel electrodes is formed on bottom support plate 104 and between electrowetting pixels 102 and bottom support plate 104. Electrode layer 110 and/or the one or more pixel electrodes are operatively coupled to a second or common electrode 112 positioned under a second or top support plate 114 for creating, in conjunction with common electrode 112, a voltage differential between electrode layer 110 and common electrode 112 to cause displacement of the first liquid, e.g., an oil, within the associated electrowetting pixel 102. These example embodiments are not limiting with respect to the location of the first electrode and the second electrode, and claimed subject matter is not limited in this respect. In particular embodiments, one or more additional layers may be positioned between electrode layer 110 and bottom support plate 104, in which thin film transistors (TFTs), gates, and/or source lines are located, for example. In these embodiments, electrode layer 110 may not be formed directly on bottom support plate 104. In various embodiments, electrode layer 110 may be connected to any number of transistors, such as suitable TFTs (not shown), which are switched to either select or deselect corresponding electrowetting pixels 102 using active matrix addressing, for example. A TFT is a particular type of field-effect transistor that includes thin films of an active semiconductor layer as well as a dielectric layer and metallic contacts over a supporting (but non-conducting) substrate, which may be glass or any suitable transparent or non-transparent material, for example.

In example embodiments, a reflective layer 116 is positioned adjacent, e.g., on electrode layer 110, as shown in FIGS. 1 and 2, for example. In particular embodiments, one or more additional layers may be positioned between reflective layer 116 and electrode layer 110. In these embodiments, reflective layer 116 may not be formed directly on electrode layer 110. In an alternative embodiment, reflective layer 116 is positioned under a transparent electrode layer. In this alternative embodiment, reflective layer 116 is positioned between the transparent electrode layer 110 and bottom support plate 104. Reflective layer 116 may reflect light within the entire visible spectrum, making the layer appear relatively bright, or reflect a portion of light within the visible spectrum, making the layer have a color. In this embodiment, reflective layer 116 is positioned within the pixel region, e.g., within or under each electrowetting pixel 102, to provide specular reflection.

In example embodiments, reflective layer 116 is positioned on electrode layer 110 within electrowetting pixel 102 or, alternatively, on electrode layer 110 and under electrowetting pixel 102. In certain embodiments, reflective layer 116 is formed or made of any suitable materials including, for example, a metal (90%, 95% or greater than 95% metal), an alloy, a doped metal, or a dielectric reflective material. Suitable metal materials for reflective layer 116 include, without limitation, aluminum, silver, gold, copper, nickel, platinum, rhodium, lanthanum, and/or silicon nickel. Suitable alloy materials for reflective layer 116 include, without limitation, aluminum with copper or aluminum with nickel. In further alternative embodiments, reflective layer 116 is made of any suitable material providing a desired specular reflectance. In alternative embodiments, reflective layer includes a suitable diffuse reflective material deposited on or over electrode layer 110. In this alternative embodiment, any suitable diffuse reflective material, such as titanium dioxide ($TiO_2$), providing a desired diffuse reflectance may be used.

Electrowetting pixels 102 may have specific and/or additional structural features. Additionally or alternatively, reflective layer 116 may have structural features, for example, one or more relatively thinner areas and/or one or more relatively thicker areas within reflective layer 116 to control movement of the fluids. Alternatively, reflective layer 116 may be deposited on a structural feature conforming to a shape of the structural feature.

A suitable dielectric barrier layer 120 may at least partially separate electrode layer 110 from a hydrophobic layer 122, such as an amorphous fluoropolymer layer forming a bottom surface of electrowetting pixel 102 in certain embodiments. For example, dielectric barrier layer 120 may be deposited on reflective layer 116. Dielectric barrier layer 120 may be formed from various materials including one or more organic material layers or a combination of organic and inorganic material layers. A thickness of the insulating dielectric barrier layer 120 may be less than 2 micrometers and may be less than 1 micrometer; for example, the insulating dielectric barrier layer 120 may be 100 nanometers to 800 nanometers in thickness in certain embodiments. In some embodiments, hydrophobic layer 122 is an amorphous fluoropolymer layer including any suitable fluoropolymer(s), such as AF1600® fluoropolymer, produced by DuPont, based in Wilmington, Del. Hydrophobic layer 122 is transparent in the example embodiment. As described above, in certain embodiments, reflective layer 116 can act both as a pixel electrode and a reflective layer.

In the example embodiment, one or more pixel walls 108 form patterned electrowetting pixel grid 101 on hydrophobic layer 122. Pixel walls 108 may include a photoresist material such as, for example, an epoxy-based negative photoresist material SU-8. Patterned electrowetting pixel grid 101 includes a plurality of rows and a plurality of columns that form an array of electrowetting pixels, such as shown in FIG. 3, including a plurality of electrowetting pixels 102 that may have a width and a length in a range of about 50 to 500 micrometers, for example, and, more particularly, in one embodiment, electrowetting pixels 102 have a width of 60 micrometers and a height of 120 micrometers.

A first liquid 130, which may have a thickness (e.g., a height as shown in FIGS. 1 and 2 for example) in a range of about 1 micrometer to 10 micrometers, for example, overlays hydrophobic layer 122. First liquid 130 is partitioned by pixel walls 108 of patterned electrowetting pixel grid 101. A second liquid 132, such as an electrolyte solution, overlays first liquid 130 and, in certain embodiments, at least a portion of pixel walls 108 of patterned electrowetting pixel grid 101. In certain embodiments, as described above, second liquid 132 may be electrically conductive and/or polar. For example, second liquid 132 may be water or a water solution, or a salt solution such as a solution of potassium chloride in water or a mixture of water and ethyl alcohol. In certain embodiments, second liquid 132 is transparent, but may be colored or absorbing. First liquid 130 is electrically non-conductive and may, for example, be an alkane-like hexadecane or (silicone) oil. As described above, second liquid 132 is immiscible with first liquid 130.

As described above, hydrophobic layer 122 is arranged on or over bottom support plate 104 to create an electrowetting surface area. The hydrophobic character of hydrophobic layer 122 causes first liquid 130 to adjoin preferentially to hydrophobic layer 122 because first liquid 130 has a higher wettability with respect to a top surface of hydrophobic layer 122 than second liquid 132 in the absence of a voltage. Wettability relates to the relative affinity of a fluid, e.g., a liquid, for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the liquid tends to form a film on the surface of the solid.

Top support plate 114 covers second liquid 132 and one or more spacers 136 to maintain second liquid 132 over electrowetting pixel grid 101. In one embodiment, spacers 136 are positioned between top support plate 114 and pixel wall 108. In example embodiments, spacer 136 is coupled to and extends from top support plate 114 to contact a contact surface on a first or distal end of one or more corresponding pixel walls 108. In certain embodiments, one or more components or layers may be positioned between top support plate 114 and spacers 136. In this arrangement, a contact surface of spacer 136 contacts a contact surface of corresponding pixel wall 108 to provide a stable contact joint at an interface between pixel wall 108 and spacer 136, providing mechanical strength at the interface that is less sensitive to overflow and/or leakage of first liquid 130 and/or second liquid 132 contained within the pixel regions. In alternative embodiments, spacer 136 does not rest on pixel wall 108 but is substantially aligned with pixel wall 108. This arrangement may allow spacer 136 to come into contact with pixel wall 108 upon a sufficient pressure or force being applied to top support plate 114. Multiple spacers 136 may be interspersed throughout electrowetting pixel grid 101. In certain embodiments, one or more color filter layers 138 including, for example, color filters 140a-140d as shown in FIGS. 1 and 2, may be positioned between second electrode 112 and top support plate 114. A seal 142 extends about a perimeter of electrowetting display device 100 to contain first liquid 130 and second liquid 132 within the fluid region of the cavity. A voltage applied across, among other things, second liquid 132 and electrode layer 110 of individual electrowetting pixel regions controls transmittance or reflectance of the associated electrowetting pixels 102.

Reflective electrowetting display device 100 has a viewing side 160 corresponding to top support plate 114 through which an image formed by reflective electrowetting display device 100 may be viewed, and an opposing rear side 162 corresponding to bottom support plate 104 as shown, for example, in FIGS. 1 and 2. Reflective electrowetting display device 100 may be a segmented display type in which the image is built of segments. The segments may be switched simultaneously or separately. Each segment includes one electrowetting pixel 102 or a number of electrowetting pixels 102 that may be neighboring or distant from one another. Electrowetting pixels 102 included in one segment are switched simultaneously, for example. Electrowetting display device 100 may also be an active matrix driven display type or a passive matrix driven display, for example.

As described above, hydrophobic layer 142 is arranged on bottom support plate 104 to create display surface area 106. The hydrophobic character of hydrophobic layer 142 causes first liquid 150 to adjoin preferentially to hydrophobic layer 142 because first liquid 150 has a higher wettability with respect to a top surface of hydrophobic layer 142 than second liquid 152 in the absence of a voltage. Wettability relates to the relative affinity of a liquid for the surface of a solid. Wettability increases with increasing affinity, and it may be measured by the contact angle formed between the liquid and the solid and measured internal to the liquid of interest. For example, such a contact angle may increase from relative non-wettability for a contact angle of more than 90° to complete wettability for a contact angle of 0°, in which case the liquid tends to form a film on the surface of the solid.

Figure 4:
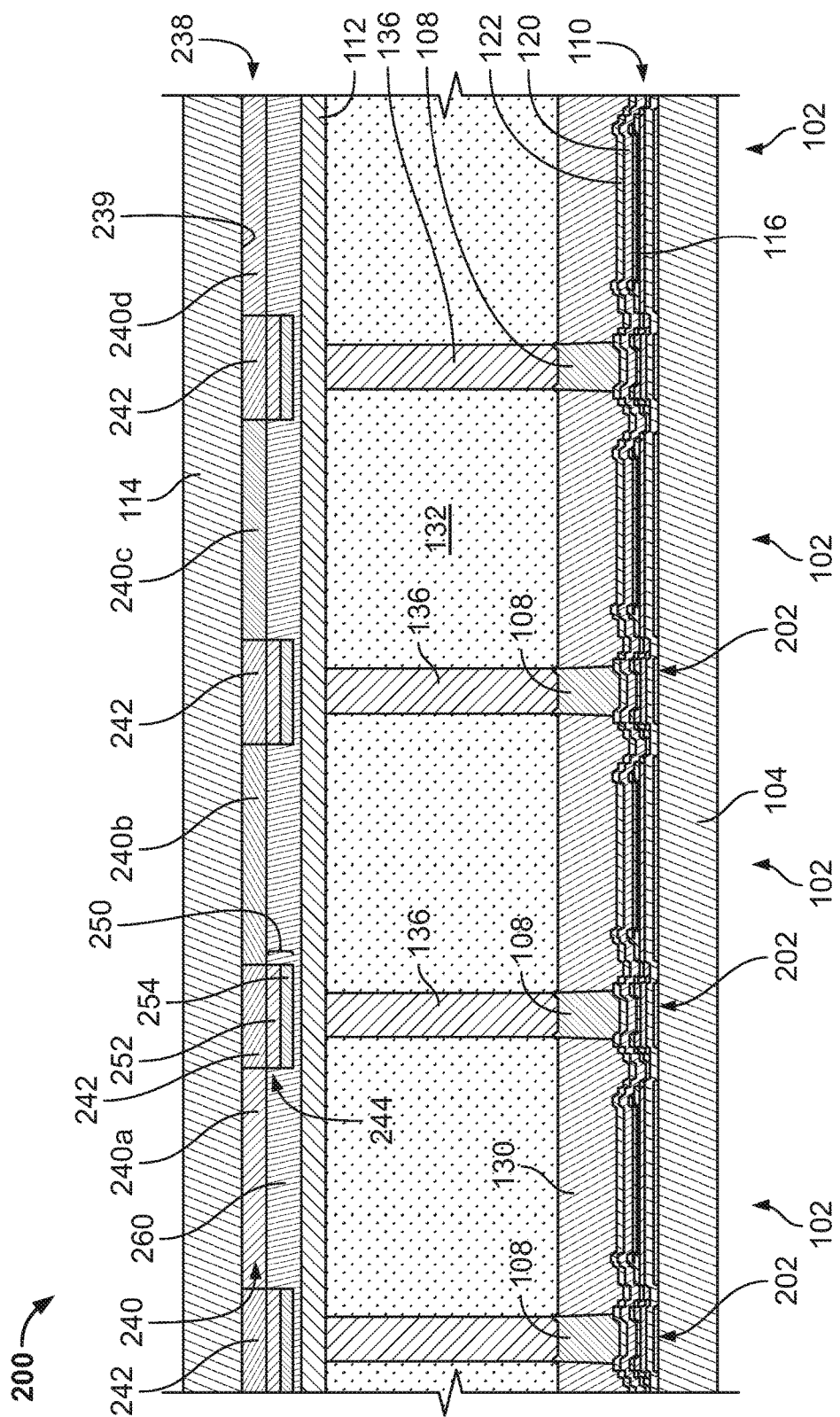
FIG. 4 is a cross-sectional view of a portion of an example electrowetting display device, according to various embodiments.

FIG. 4 is a cross-sectional view of a portion of an example display device, such as reflective electrowetting display device 200, with several electrowetting pixel regions positioned between bottom support plate 104 and top support plate 114. Each pixel region includes an electrowetting pixel 102 formed over bottom support plate 104 to define display surface area 106, as shown in FIG. 3. Electrode layer 110 having a plurality of pixel electrodes is formed on bottom support plate 104 and between electrowetting pixels 102 and bottom support plate 104. Electrode layer 110 and/or the one or more pixel electrodes are operatively coupled to a second or common electrode 112 positioned under a second or top support plate 114 for creating, in conjunction with common electrode 112, a voltage differential between electrode layer 110 and common electrode 112 to cause displacement of first liquid 130 within associated electrowetting pixel 102.

A TFT structure 202 is positioned between pixel wall 108 and bottom support plate 104. As shown in FIG. 4, pixel wall 108 is directly under or aligned with pixel wall 108. A suitable dielectric barrier layer 120 may at least partially separate electrode layer 110 from a hydrophobic layer 122, such as an amorphous fluoropolymer layer forming a bottom surface of electrowetting pixel 102 in certain embodiments. For example, dielectric barrier layer 120 may be deposited on reflective layer 116. In some embodiments, hydrophobic layer 122 is an amorphous fluoropolymer layer including any suitable fluoropolymer(s), such as AF1600® fluoropolymer, produced by DuPont, based in Wilmington, Del. Hydrophobic layer 122 is transparent in the example embodiment. As described above, in certain embodiments, reflective layer 116 can act both as a pixel electrode and a reflective layer.

In the example embodiment, one or more pixel walls 108 form patterned electrowetting pixel grid 101 on hydrophobic layer 122. Pixel walls 108 may include a photoresist material such as, for example, epoxy-based negative photoresist material SU-8. Patterned electrowetting pixel grid 101 includes a plurality of rows and a plurality of columns that form an array of electrowetting pixels, such as shown in FIG. 3, including a plurality of electrowetting pixels 102 that may have a width and a length in a range of about 50 to 500 micrometers, for example. First liquid 130, e.g., an opaque oil, overlays hydrophobic layer 122. First liquid 130 is partitioned by pixel walls 108. Second liquid 132, e.g., an electrolyte solution, overlays first liquid 130 and pixel walls 108.

Top support plate 114 covers second liquid 132 and one or more spacers 136 to maintain second liquid 132 over electrowetting pixel grid 101. In one embodiment, spacers 136 are positioned between top support plate 114 and pixel wall 108. As shown in FIG. 4, each spacer 136 is coupled to and extends from top support plate 114 to contact a corresponding pixel wall 108. In certain embodiments, one or more components or layers may be positioned between top support plate 114 and spacers 136.

Referring further to FIG. 4, one or more color filter layers 238 is disposed on, e.g., deposited on, an inner surface 239 of top support plate 114 using a suitable method. Color filter layer 238 includes a plurality of color filters, collectively referred to as color filters 240. For example, in example embodiments, color filter layer 138 includes a red color filter 240a, a green color filter 240b, a blue color filter 240c, and a white or transparent color filter 240d positioned between second electrode 112 and top support plate 114. As shown in FIG. 4, each color filter 240a-240d is positioned within a respective pixel region and directly over or aligned with a respective electrowetting pixel 102 within the respective pixel region. Each color filter 240a-240d may be configured to be substantially transparent to particular ranges of wavelengths of light, while absorbing others. For example, red color filter 240a may be transparent to red light having wavelengths ranging from 620 nanometers (nm) to 750 nm, while absorbing light having other wavelengths. Green color filter 240b may be transparent to green light having wavelengths ranging from 495 nm to 570 nm, while absorbing light having other wavelengths. Blue color filter 240c may be transparent to blue light having wavelengths ranging from 450 nm to 495 nm, while absorbing light having other wavelengths. Transparent color filter 240d may be transparent to all wavelengths of visible light, namely white light. As used herein, visible light refers to wavelengths of electromagnetic radiation visible to the human eye. Generally, this includes electromagnetic radiation having wavelengths between about 400 nm to about 800 nm. Color filters 240a-240d, therefore, may be utilized to assign each pixel 102 a color, so that when a particular pixel 102 is in an open state, light reflected by that pixel will take on the color of the color filter associated with that pixel 102.

Each pixel 102 is associated with a color filter 240. Colors filters 240 (including color filters 240a, 240b, 240c, and 240d) may be constructed with a generally transparent material such as a photoresist material or photo-definable polymer, including electromagnetic radiation filtering materials suspended within the material. Color filters 240a, 240b, 240c, and 240d may be formed by the addition of pigments or dyes to a clear photo-definable polymer, for example. The amount of additive depends on system requirements, such as absorbance or transmission specifications. In some cases, polyacrylates are used as photoresist material. General, the organic dyes and pigments used within color filters 240a, 240b, 240c, and 240d can have molecular structures containing chromophoric groups generating the color filtering properties. Some examples for chromophoric groups are azo-, anthraquinone-, methine- and phtalocyanine-groups. Color filters 240 may also be formed using a dichromated gelatin doped with a photosynthesizer, dyed polyimides, resins, and the like.

Color filters 240 are configured to overlay each pixel 102 entirely so that the color filters 240 extend from one pixel wall 108 on a first side of pixel 102 to an opposing pixel wall 108 on a second side of pixel 102. In one embodiment, electrowetting display device 200 includes a combination of red, blue, green, and white color filters 240, with one color filter 240 being positioned over each pixel 102. Using color filters 240, each pixel 102 in electrowetting display device 200 can be associated with a particular wavelength of electromagnetic radiation. By controlling which pixels 102 are active within electrowetting display device 200, electrowetting display device 200 can generate color images viewable by a user at viewing side 160. In one embodiment, red color filters 240a may be transparent to red light having wavelengths ranging from 620 nm to 750 nm, while being absorbing light having other wavelengths. Green color filter 240b may be transparent to green light having wavelengths ranging from 495 nm to 570 nm, while being absorbing to light having other wavelengths. Blue color filter 240c may be transparent to blue light having wavelengths ranging from 450 nm to 495 nm, while being absorbing to light having other wavelengths. White color filter 240d may be transparent to all wavelengths of visible light. In other embodiments, different ranges of light wavelengths may be associated with the red, green, and blue color filters 240. In still other embodiments, color filters 240 may be configured to block or transmit electromagnetic radiation of different wavelengths entirely. For example, electrowetting display device 200 may be configured to generate images using pixels 102 having color filters 240 configured to transmit electromagnetic radiation of the colors cyan, magenta, and yellow. In short, color filters 240 may be developed and utilized within electrowetting display device 200 in accordance with any display color model. In the example embodiment, color filter layer 238 includes a black matrix material, e.g., one or more black matrix members 242, positioned around at least a portion of each color filter 240 to form a boundary or border around at least a portion of the associated color filter 240.

In example embodiments, the black matrix material is aligned with or positioned directly over one or more pixel walls 108 associated with an associated electrowetting pixel 102. As shown in FIG. 4, electrowetting display device 200 includes a black matrix member 242 positioned over each pixel wall 108. More specifically, black matrix member 242 is positioned along an edge 244 of a first color filter, for example, red color filter 240a, between red color filter 140a and an adjacent second color filter, for example, green color filter 240b. Color filters 240 are adjacent when they are next to one another in the display device with no intervening color filter 240 between. Black matrix member 242 is formed between red color filter 240a and green color filter 240b so that black matrix member 242 between red color filter 240a and green color filter 240b runs along a boundary between red color filter 240a and green color filter 240b. A color stack 250 is positioned on, e.g., formed or deposited on, black matrix member 242. In the example embodiments, color stack 250 includes a first color layer 252 and a second color layer 254. In the example embodiment shown in FIG. 4, first color layer 252, e.g., a layer of red color material, is disposed on black matrix member 242 and second color layer 254, e.g., a layer of blue color material, is disposed on first color layer 252. First color layer 252 includes a red photoresist material and second color layer 254 includes a blue photoresist material. In alternative embodiments, first color layer 252 includes a blue color material or another suitable color material and second color layer 254 includes a red color material or another suitable color material.

In the example embodiment, black matrix member 242 has an optical density greater than 2.0 and color stack 250 has an optical density greater than 1.0 to provide an overall optical density of the integrated black matrix, i.e., a combination of black matrix member 242 and color stack 250, of 3.0 or greater and, more particularly, an overall optical density of the integrated black matrix of 3.5 or greater. For example, in this embodiment, black matrix member 242 has an optical density greater than 2.0 at wavelengths of 550 nanometers to 650 nanometers and color stack 250 has an optical density greater than 1.0 at wavelengths of 550 nanometers to 650 nanometers. Additionally, in example embodiments, black matrix member 242 has a reflectance less than 2.0% and, more particularly, a reflectance less than 1.0%.

Referring further to FIG. 4, a plurality of pixel walls 108 is formed over bottom support plate 104. The plurality of pixel walls 108 are associated with a pixel 102 within the pixel region. Each black matrix member 242 is positioned directly over a respective pixel wall 108 of the plurality of pixel walls 108. In this embodiment, TFT structure 202 is positioned under pixel wall 108 and between pixel wall 108 and bottom support plate 104. Further, a planarization layer 260 is positioned over, formed or deposited on, color filter layer 238 and color stack 250. In this example embodiment, common electrode 112 is positioned over, e.g., formed or deposited on, planarization layer 260 and within the pixel region. First liquid 130, e.g., an opaque oil, and second liquid 132, e.g., an electrolyte solution, that is immiscible with first liquid 130 are arranged in the pixel region between bottom support plate 104 and top support plate 114. More specifically, first liquid 130 is contained within each electrowetting pixel 102 and second liquid 132 is contained with the liquid region between common electrode 112 and electrowetting pixels 102, in contact with common electrode 112. Spacers 136 are coupled to, e.g., formed on, common electrode 112 within the respective pixel region. Each spacer 136 extends from common electrode 112 to contact a corresponding pixel wall 108.

Figure 5:
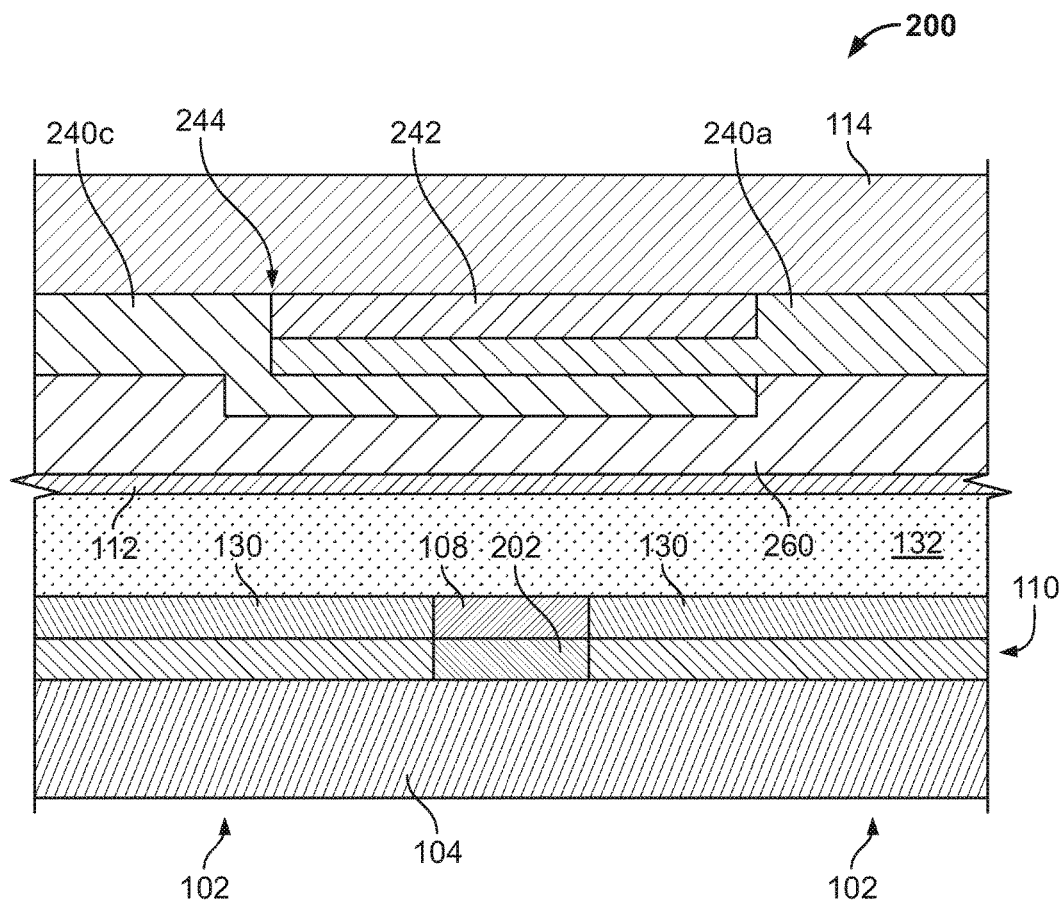
FIG. 5 is a cross-sectional view of a portion of an example electrowetting display device, according to various embodiments.

In an example alternative embodiment as shown in FIG. 5, the black matrix material is aligned with or positioned directly over one or more pixel walls 108 associated with an associated electrowetting pixel 102. As shown in FIG. 5, black matrix member 242 is positioned over pixel wall 108. In this embodiment, black matrix member 242 is positioned along an edge 244 of a first color filter, for example, a blue color filter 240c, between blue color filter 240c and an adjacent second color filter, for example, a red color filter 240a. Black matrix member 242 is formed between blue color filter 240c and red color filter 240a so that black matrix member 242 between blue color filter 240c and red color filter 240a runs along a boundary between blue color filter 240c and red color filter 240a. In this embodiment, red color filter 240a overlaps at least a portion of a bottom surface of black matrix member 242 along a width of black matrix member 242 between blue color filter 240c and red color filter 240a and blue color filter 240c overlaps a portion of red color filter 240a along the width of black matrix member 242 to form color stack 250. In an alternative embodiment, blue color filter 240c overlaps at least a portion of the bottom surface of black matrix member 242 along the width of black matrix member 242 between blue color filter 240c and red color filter 240a and red color filter 240a overlaps a portion of blue color filter 240c along the width of black matrix member 242 to form color stack 250. Planarization layer 260 is positioned over, formed or deposited on, color filter layer 238 and color stack 250 and common electrode 112 is positioned over, e.g., formed or deposited on, planarization layer 260.

In one example embodiment, an electrowetting display device includes a first support plate and an opposing second support plate. An electrowetting pixel region is between the first support plate and the second support plate. A plurality of pixel walls over the first support plate are associated with an electrowetting pixel within the electrowetting pixel region. A color filter layer is formed on the second support plate within the electrowetting pixel region and positioned over the plurality of pixel walls. The color filter layer includes a color filter positioned directly over the electrowetting pixel and a black matrix material forming a border around the color filter. The black matrix material is positioned directly over the plurality of pixel walls associated with the electrowetting pixel. A color stack is formed on the black matrix material. The color stack includes a first color material on the black matrix material and a second color material on the first color material. In another example embodiment, an electrowetting display device includes a first support plate and an opposing second support plate. A plurality of electrowetting pixel regions are positioned or formed between the first support plate and the second support plate. The plurality of electrowetting pixel regions includes a first electrowetting pixel region and a second electrowetting pixel region adjacent the first electrowetting pixel region.

A plurality of pixel walls is formed over the first support plate. A first plurality of pixel walls formed over the first support plate is associated with a first electrowetting pixel within the first electrowetting pixel region and a second plurality of pixel walls formed over the first support plate is associated with a second electrowetting pixel within the second electrowetting pixel region. In certain embodiments, at least one pixel wall, e.g., a first pixel wall, of the first plurality of pixel walls is associated with the second electrowetting pixel. A color filter layer is formed over, e.g., on the second support plate. The color filter layer includes a black matrix material positioned directly over the first plurality of pixel walls associated with the first electrowetting pixel and the second plurality of pixel walls associated with the second electrowetting pixel. A first color filter is formed on or over the surface of the second support plate and positioned directly over the first electrowetting pixel. In this embodiment, the black matrix material forms a border around the first color filter and a portion of the first color filter is disposed over or covers a first portion of the black matrix material. The first color filter is transparent to a first color of visible light. A second color filter is formed on or over the surface of the second support plate and positioned directly over the second electrowetting pixel. A portion of the second color filter is disposed over or the portion of the first color filter covering the first portion of the black matrix material. The second color filter is transparent to a second color of visible light.

In yet another example embodiment, a display device includes a bottom support plate and an opposing top support plate. A pixel region is between the bottom support plate and the top support plate. A color filter layer on an inner surface of the top support plate includes a plurality of color filters, wherein a first color filter of the plurality of color filters is positioned within the pixel region. A black matrix member is positioned or formed along an edge of the first color filter, between the first color filter and an adjacent second color filter of the plurality of color filters. A color stack is positioned or formed on the black matrix member. The color stack includes a first color layer and a second color layer. In another example embodiment, a display device includes a bottom support plate and an opposing top support plate. A plurality of pixel regions is positioned between the bottom support plate and the top support plate. Each pixel region of the plurality of pixel regions includes a pixel having a plurality of pixel walls. A color filter layer is formed on an inner surface of the top support plate. The color filter layer includes a plurality of color filters. Each color filter of the plurality of color filters is positioned within an associated pixel region of the plurality of pixel regions. A black matrix material is disposed between the first color filter and an adjacent second color filter of the plurality of color filters. A portion of the first color filter is disposed over or covers the black matrix material and a portion of the second color filter is disposed over or covers the portion of the first color filter.

Figure 6:
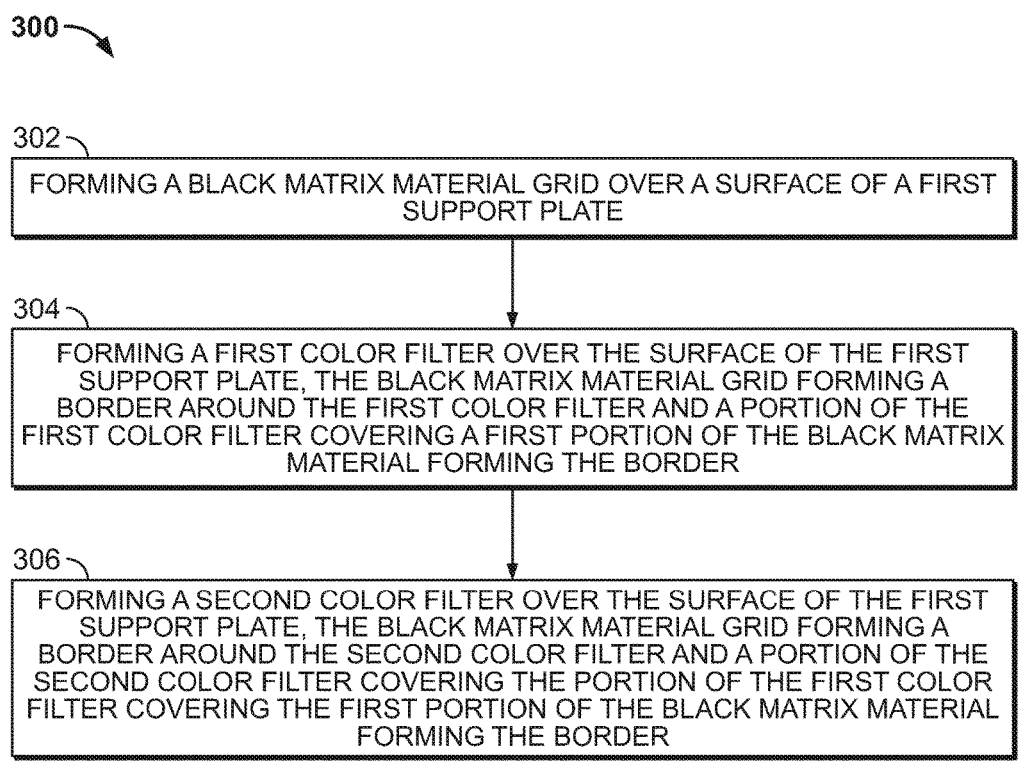
FIG. 6 illustrates an example method for fabricating an example electrowetting display device such as shown in FIGS. 1-5.

FIG. 6 is a flow diagram of an example method 300 for fabricating an electrowetting display device, such as electrowetting display device 100 including a color filter layer having a black matrix material and a color stack formed on the black matrix material, such as shown in FIGS. 1-5. Though claimed subject matter is not limited in this respect, method 300 may be performed manually (e.g., by humans) and/or using automated equipment. At block 302, a black matrix material grid is formed over a surface of a first support plate. The black matrix material grid includes a plurality of black matrix members having an optical density greater than 2.0. In one embodiment, a first photoresist material is deposited over a surface of a support plate, i.e., top support plate 114 using a suitable coating process. In example embodiments, the first photoresist material has an optical density greater than 2.0. The first photoresist material is patterned through a first mask to form a patterned first photoresist material. The patterned first photoresist material is then developed to form the black matrix material grid having a plurality of black matrix members.

A first color filter layer including a first color filter is formed 304 over the surface of the first support plate. In the example embodiment, the black matrix material grid forms a border around the first color filter and a portion of the first color filter is disposed over or covers a first portion of the black matrix material forming the border. The first color filter is transparent to a first color of visible light.

A second photoresist material, such as a red photoresist material, is deposited over the surface of the first support plate and the black matrix grid, e.g., one or more black matrix members. The second photoresist material is transparent to a first color of visible light and capable of absorbing one or more colors of visible light. The second photoresist material is patterned through a second mask to form a patterned second photoresist material. The patterned second photoresist material is then developed to form the first color filter that is transparent to the first color of visible light and absorbing one or more colors of visible light, for example, a second color of visible light. In the example embodiment, the portion of the second photoresist material forming the first color filter is disposed over or at least partially covers a first black matrix member of the plurality of black matrix members disposed between the first color filter and a second color filter adjacent the first color filter. In example embodiments, the one or more black matrix members form at least a portion of a border around the first color filter.

As shown in FIG. 6, in the example embodiment, a second color filter layer including a second color filter is formed 306 over the surface of the first support plate. The black matrix material grid forms a border around the second color filter and a portion of the second color filter is disposed over or covers the portion of the first color filter disposed over or covering the first portion of the black matrix material forming the border. The second color filter is transparent to a second color of visible light. In this embodiment, a third photoresist material, such as a blue photoresist material, is deposited over the surface of the first support plate and the portion of the first color filter covering the first black matrix member. The third photoresist material is transparent to a second color of visible light. The third photoresist material is patterned through a third mask to form a patterned third photoresist material. The patterned third photoresist material is then developed to form the second color filter that is transparent to the second color of visible light and absorbing one or more colors of visible light, for example, the first color and/or a third color of visible light. In example embodiments, one or more black matrix members form at least a portion of a border around the second color filter. The portion of the third photoresist material forming the second color filter is at least partially disposed over or at least partially covers the portion of the first color filter covering the black matrix material, e.g., the first black matrix member. In this embodiment, a combination of the portion of the first color filter and the portion of the second color filter, i.e., the portion of the first color filter disposed over or covering the first portion of the black matrix material, e.g., the first black matrix member, and the portion of the second color filter disposed over or covering the portion of the first color filter together, has an optical density greater than 1.0.

In one embodiment, the black matrix material grid, e.g., the black matrix members, formed over the surface of the support plate may act as an alignment marker for depositing the second photoresist material and/or the third photoresist material over the surface of the first support plate. In an alternative embodiment, only one of the first color filter and the second color filter is disposed over or covers the one or more black matrix members. Referring further to FIG. 5, in example embodiments, the second photoresist material forms red color filter 240*a* and the third photoresist material forms blue color filter 240*c*. A portion of red color filter 240*a* is disposed over or covers or overlaps at least a portion of black matrix member 242 and a portion of blue color filter 240*c* is disposed over or covers or overlaps the portion of red color filter 240*a* covering black matrix member 242.

Further, the same or similar color stack can be formed between adjacent red and green pixels or sub-pixels, for example. In this arrangement, a fourth photoresist material, i.e., a green photoresist material, is deposited over the surface of the support plate and the black matrix gird including the plurality of black matrix members. In certain embodiments, the fourth photoresist material is deposited over the surface of the support plate before the third photoresist material, i.e., the blue photoresist material, is deposited over the surface of the support plate. The fourth photoresist material is transparent to a third color of visible light, i.e., green, and capable of absorbing one or more colors of visible light. The fourth photoresist material is patterned through a fourth mask to form a patterned fourth photoresist material. The patterned fourth photoresist material is then developed to form the third color filter, i.e., color filter 240*b*, that is transparent to the third color of visible light and absorbs one or more colors of visible light. In this embodiment, a portion of the fourth photoresist material forming the third color filter is disposed over or at least partially covers the portion of the second photoresist material (forming the first color filter) at least partially covering the black matrix material, e.g., one or more black matrix members. In example embodiments, the black matrix material forms at least a portion of a border around the third color filter. The third photoresist material is then deposited over the fourth photoresist material and the second photoresist material at least partially covering the one or more black matrix members. The third photoresist material is patterned, as described above, and the patterned third photoresist material is developed to form the second color filter. The third photoresist material at least partially covers the cured portion of the fourth photoresist material covering the cured portion of the second photoresist material at least partially covering the one or more black matrix members. In an alternative embodiment, the portion of the fourth photoresist material covering the cured portion of the second photoresist material is removed and the third photoresist material is deposited directly on the cured portion of the second photoresist material.

A planarization layer is formed over the color filter layer, e.g., the black matrix material grid and the color filters, to form a layer having a smooth, planar surface. A common electrode is then formed or positioned on the planarization layer and within the pixel region. In certain embodiments, a spacer is formed on the common electrode. The spacer extends from the common electrode to contact a respective pixel wall.

Method 300 continues, in example embodiments, by forming an electrode layer 110 on first or bottom support plate 104. In an example embodiment, electrode layer 110 is deposited on bottom support plate 104 using a suitable physical vapor deposition process (PVD) such as sputtering. Additional layers may be positioned between electrode layer 110 and bottom support plate 104. In one embodiment, a multilayer stack including a first conductive layer is formed on bottom support plate 104. In this embodiment, the first conductive layer is indium tin oxide (ITO), although in alternative embodiments the first conductive layer may be another suitable material. Deposition techniques include, for example, chemical vapor deposition (CVD), PVD, molecular beam epitaxy (MBE), and sputtering. The multilayer stack includes a first dielectric layer deposited on the first conductive layer. The first dielectric layer may comprise SiN, SiON, SiO, or TaO, for example. Any suitable deposition technique may be used, such as CVD, PVD, MBE, and a sputtering, for example. In a particular embodiment, forming electrode layer 110 on bottom support plate 104 includes forming, e.g., disposing, 304 a reflective layer, such as reflective layer 116, on electrode layer 110. In this embodiment, the reflective layer is made of a suitable material such as an aluminum material. In certain embodiments, a suitable barrier layer 140 is formed on ITO layer 130 and a hydrophobic layer, such as an AF 1600® layer, (e.g., hydrophobic layer 142, shown in FIGS. 1 and 2) is formed over barrier layer 140. A plurality of pixel walls 108 are formed to define a patterned electrowetting pixel grid 101 on hydrophobic layer 142. For example, a first plurality of pixel walls is formed over a surface of a second support plate. The first plurality of pixel walls is associated with a first electrowetting pixel. A second plurality of pixel walls is formed over the surface of the second support plate. The second plurality of pixel walls is associated with a second electrowetting pixel adjacent the first electrowetting pixel, wherein a first pixel wall of the first plurality of pixel walls is associated with the second electrowetting pixel. In one embodiment, pixel walls 108 include a photoresist material such as, for example, epoxy-based negative photoresist material SU-8. The formed patterned electrowetting pixel grid 101 includes a plurality of rows and a plurality of columns that form an array of electrowetting pixels, such as shown in FIG. 3, including a plurality of electrowetting pixels 102 having a suitable width and length.

In one embodiment, a photoresist material is deposited over the multilayer stack and the photoresist material is exposed to a diffractive dark field mask to form pixel walls 108. In alternative embodiments, these structures may be printed using suitable methods other than photolithography, including, without limitation, direct writing and electron beam lithography (EBL). Pixel walls 108 are cured and fused together and the uncured portions of the photoresist material are removed to leave pixel walls 108.

Following formation of the pixel walls, first liquid 130 and second liquid 132 (e.g., the oil and the electrolyte solution) can be disposed within electrowetting pixels 102 of electrowetting display device 100. A second support plate, such as top support plate 114, is coupled to electrowetting display device 100. As shown in FIGS. 1 and 2 for example, top support plate 114 is opposite bottom support plate 104, forming opposing outer surfaces of electrowetting display device 100. The first support plate is coupled to the second support plate to align each color filter over a respective pixel, e.g., align the first color filter over the first pixel and align the second color filter over the second pixel.

Figure 7:
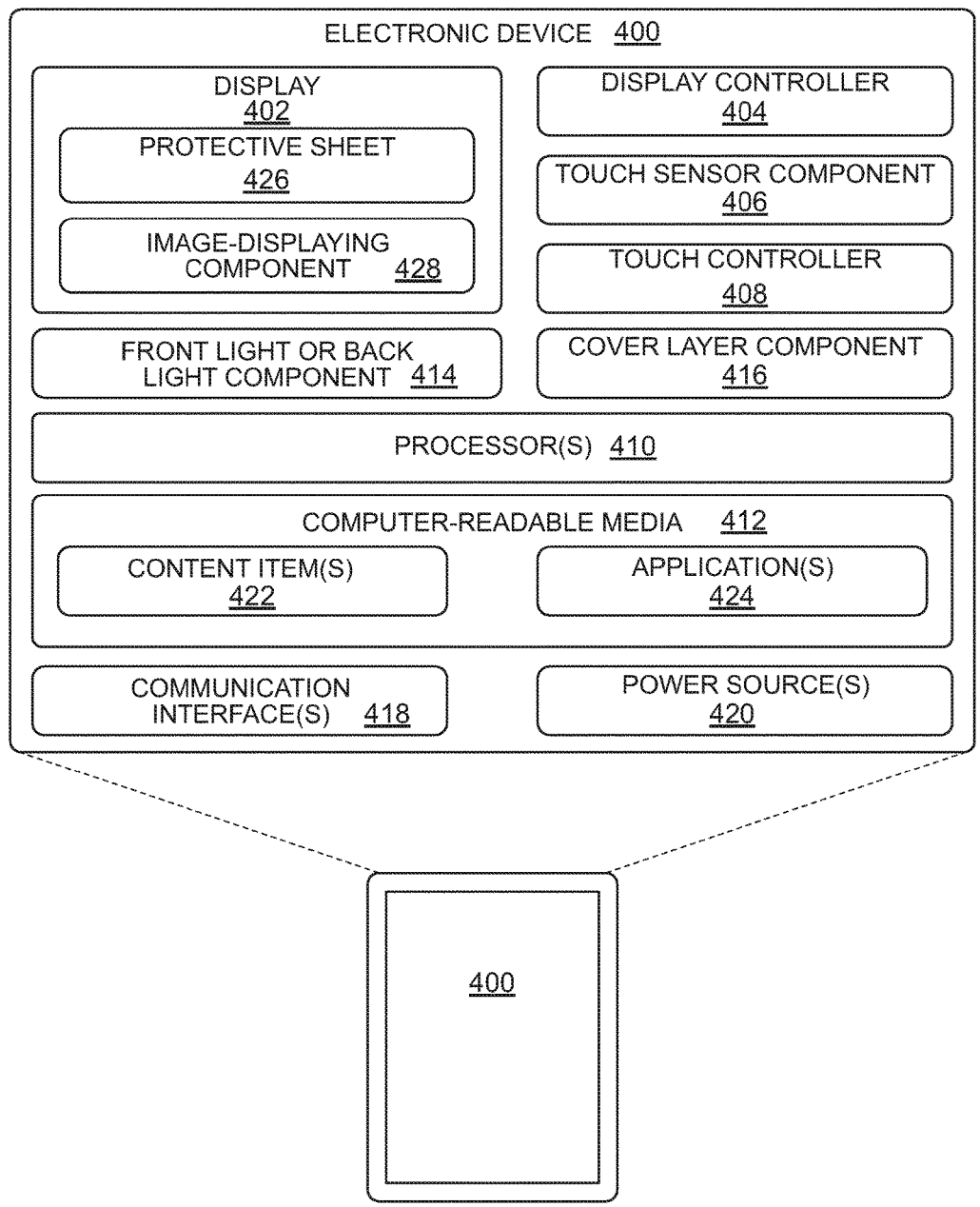
FIG. 7 illustrates an example electronic device that may incorporate an electrowetting display device, according to various embodiments.

FIG. 7 illustrates an example electronic device 400 that may incorporate any of the display devices discussed above. Electronic device 400 may comprise any type of electronic device having a display. For instance, electronic device 400 may be a mobile electronic device (e.g., an electronic book reader, a tablet computing device, a laptop computer, a smart phone or other multifunction communication device, a portable digital assistant, a wearable computing device, or an automotive display). Alternatively, electronic device 400 may be a non-mobile electronic device (e.g., a computer display or a television). In addition, while FIG. 7 illustrates several example components of electronic device 400, it is to be appreciated that electronic device 400 may also include other conventional components, such as an operating system, system busses, input/output components, and the like. Further, in other embodiments, such as in the case of a television or computer monitor, electronic device 400 may only include a subset of the components illustrated.

Regardless of the specific implementation of electronic device 400, electronic device 400 includes a display 402 and a corresponding display controller 404. Display 402 may represent a reflective or transmissive display in some instances or, alternatively, a transflective display (partially transmissive and partially reflective).

In one embodiment, display 402 comprises an electrowetting display that employs an applied voltage to change the surface tension of a liquid in relation to a surface. For example, such an electrowetting display may include the array of pixels 102 illustrated in FIG. 3, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by displacing a colored oil film if a voltage is applied to individual pixels of the display. If the voltage is absent, the colored oil forms a continuous film within a pixel, and the color may thus be visible to a user. On the other hand, if the voltage is applied to the pixel, the colored oil is displaced and the pixel becomes transparent. If multiple pixels of display 402 are independently activated, display 402 may present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video or other animated content.

Of course, while several different examples have been given, it is to be appreciated that while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, display 402 may represent a backlit display, examples of which are mentioned above.

In addition to including display 402, FIG. 7 illustrates that some examples of electronic device 400 may include a touch sensor component 406 and a touch controller 408. In some instances, at least one touch sensor component 406 resides with, or is stacked on, display 402 to form a touch-sensitive display. Thus, display 402 may be capable of both accepting user touch input and rendering content in response to or corresponding to the touch input. As several examples, touch sensor component 406 may comprise a capacitive touch sensor, a force sensitive resistance (FSR), an interpolating force sensitive resistance (IFSR) sensor, or any other type of touch sensor. In some instances, touch sensor component 406 is capable of detecting touches as well as determining an amount of pressure or force of these touches.

FIG. 7 further illustrates that electronic device 400 may include one or more processors 410 and one or more computer-readable media 412, as well as a front light component 414 (which may alternatively be a backlight component in the case of a backlit display) for lighting display 402, a cover layer component 416, such as a cover glass or cover sheet, one or more communication interfaces 418 and one or more power sources 420. The communication interfaces 418 may support both wired and wireless connection to various networks, such as cellular networks, radio, WiFi networks, short range networks (e.g., Bluetooth®), and infrared (IR) networks, for example.

Depending on the configuration of electronic device 400, computer-readable media 412 (and other computer-readable media described throughout) is an example of computer storage media and may include volatile and nonvolatile memory. Thus, computer-readable media 412 may include, without limitation, RAM, ROM, EEPROM, flash memory, and/or other memory technology, and/or any other suitable medium that may be used to store computer-readable instructions, programs, applications, media items, and/or data which may be accessed by electronic device 400.

Computer-readable media 412 may be used to store any number of functional components that are executable on processor 410, as well as content items 422 and applications 424. Thus, computer-readable media 412 may include an operating system and a storage database to store one or more content items 422, such as eBooks, audio books, songs, videos, still images, and the like. Computer-readable media 412 of electronic device 400 may also store one or more content presentation applications to render content items on electronic device 400. These content presentation applications may be implemented as various applications 424 depending upon content items 422. For instance, the content presentation application may be an electronic book reader application for rending textual electronic books, an audio player for playing audio books or songs, or a video player for playing video.

In some instances, electronic device 400 may couple to a cover (not illustrated in FIG. 7) to protect display 402 (and other components in the display stack or display assembly) of electronic device 400. In one example, the cover may include a back flap that covers a back portion of electronic device 400 and a front flap that covers display 402 and the other components in the stack. Electronic device 400 and/or the cover may include a sensor (e.g., a Hall effect sensor) to detect whether the cover is open (i.e., if the front flap is not atop display 402 and other components). The sensor may send a signal to front light component 414 if the cover is open and, in response, front light component 414 may illuminate display 402. If the cover is closed, meanwhile, front light component 414 may receive a signal indicating that the cover has closed and, in response, front light component 414 may turn off.

Furthermore, the amount of light emitted by front light component 414 may vary. For instance, upon a user opening the cover, the light from the front light may gradually increase to its full illumination. In some instances, electronic device 400 includes an ambient light sensor (not illustrated in FIG. 7) and the amount of illumination of front light component 414 may be based at least in part on the amount of ambient light detected by the ambient light sensor. For example, front light component 414 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of display 402 may vary depending on whether front light component 414 is on or off, or based on the amount of light provided by front light component 414. For instance, electronic device 400 may implement a larger default font or a greater contrast when the light is off compared to when the light is on. In some embodiments, electronic device 400 maintains, if the light is on, a contrast ratio for display 402 that is within a certain defined percentage of the contrast ratio if the light is off.

As described above, touch sensor component 406 may comprise a capacitive touch sensor that resides atop display 402. In some examples, touch sensor component 406 may be formed on or integrated with cover layer component 416. In other examples, touch sensor component 406 may be a separate component in the stack of the display assembly. Front light component 414 may reside atop or below touch sensor component 406. In some instances, either touch sensor component 406 or front light component 414 is coupled to a top surface of a protective sheet 426 of display 402. As one example, front light component 414 may include a lightguide sheet and a light source (not illustrated in FIG. 7). The lightguide sheet may comprise a substrate (e.g., a transparent thermoplastic such as PMMA or other acrylic), a layer of lacquer and multiple grating elements formed in the layer of lacquer that function to propagate light from the light source towards display 402; thus, illuminating display 402.

Cover layer component 416 may include a transparent substrate or sheet having an outer layer that functions to reduce at least one of glare or reflection of ambient light incident on electronic device 400. In some instances, cover layer component 416 may comprise a hard-coated polyester and/or polycarbonate film, including a base polyester or a polycarbonate that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a $3h$ pencil). Without such scratch resistance, a device may be more easily scratched and a user may perceive the scratches from the light that is dispersed over the top of the reflective display. In some examples, protective sheet 426 may include a similar UV-cured hard coating on the outer surface. Cover layer component 416 may couple to another component or to protective sheet 426 of display 402. Cover layer component 416 may, in some instances, also include a UV filter, a UV-absorbing dye, or the like, for protecting components lower in the stack from UV light incident on electronic device 400. In still other examples, cover layer component 416 may include a sheet of high-strength glass having an antiglare and/or antireflective coating.

Display 402 includes protective sheet 426 overlying an image-displaying component 428. For example, display 402 may be preassembled to have protective sheet 426 as an outer surface on the upper or image-viewing side of display 402. Accordingly, protective sheet 426 may be integral with and may overlay image-displaying component 428. Protective sheet 426 may be optically transparent to enable a user to view, through protective sheet 426, an image presented on image-displaying component 428 of display 402.

In some examples, protective sheet 426 may be a transparent polymer film in the range of 25 to 200 micrometers in thickness. As several examples, protective sheet 426 may be a transparent polyester, such as polyethylene terephthalate (PET) or polyethylene naphthalate (PEN), or other suitable transparent polymer film or sheet, such as a polycarbonate or an acrylic. In some examples, the outer surface of protective sheet 426 may include a coating, such as the hard coating described above. For instance, the hard coating may be applied to the outer surface of protective sheet 426 before or after assembly of protective sheet 426 with image-displaying component 428 of display 402. In some examples, the hard coating may include a photoinitiator or other reactive species in its composition, such as for curing the hard coating on protective sheet 426. Furthermore, in some examples, protective sheet 426 may be dyed with a UV-light-absorbing dye, or may be treated with other UV-absorbing treatment. For example, protective sheet 426 may be treated to have a specified UV cutoff such that UV light below a cutoff or threshold wavelength is at least partially absorbed by protective sheet 426, thereby protecting image-displaying component 428 from UV light.

According to some embodiments herein, one or more of the components discussed above may be coupled to display 402 using liquid optically-clear adhesive (LOCA). For example, the light guide portion of front light component 414 may be coupled to display 402 by placing LOCA on the outer or upper surface of protective sheet 426. If the LOCA reaches the corner(s) and/or at least a portion of the perimeter of protective sheet 426, UV-curing may be performed on the LOCA at the corners and/or the portion of the perimeter. Thereafter, the remaining LOCA may be UV-cured and front light component 414 may be coupled to the LOCA. By first curing the corner(s) and/or the perimeter, the techniques effectively create a barrier for the remaining LOCA and also prevent the formation of air gaps in the LOCA layer, thereby increasing the efficacy of front light component 414. In other embodiments, the LOCA may be placed near a center of protective sheet 426, and pressed outwards towards a perimeter of the top surface of protective sheet 426 by placing front light component 414 on top of the LOCA. The LOCA may then be cured by directing UV light through front light component 414. As discussed above, and as discussed additionally below, various techniques, such as surface treatment of the protective sheet, may be used to prevent discoloration of the LOCA and/or protective sheet 426.

While FIG. 7 illustrates a few example components, electronic device 400 may have additional features or functionality. For example, electronic device 400 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within electronic device 400 may reside remotely from electronic device 400 in some implementations. In these implementations, electronic device 400 may utilize communication interfaces 418 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A display device, comprising:
   a bottom support plate and a top support plate opposite to the bottom support plate;
   a plurality of pixel regions positioned between the bottom support plate and the top support plate, each pixel region of the plurality of pixel regions including a pixel having a plurality of pixel walls; and
a color filter layer on an inner surface of the top support plate, the color filter layer comprising:
a plurality of color filters, each color filter of the plurality of color filters positioned at least partly within an associated pixel region of the plurality of pixel regions; and
a black matrix material disposed between: a first color filter of the plurality of color filters and a second color filter of the plurality of color filters adjacent to the first color filter,
wherein a portion of the first color filter is positioned partly within a first pixel region of the plurality of pixel regions and partly within a second pixel region of the plurality of pixel regions and is disposed over the black matrix material, and a portion of the second color filter is positioned partly within the first pixel region and partly within the second pixel region and is disposed over the portion of the first color filter.

2. The display device of claim 1, wherein the first color filter comprises a red photoresist material and the second color filter comprises a blue photoresist material.

3. The display device of claim 1, wherein the plurality of color filters includes a third color filter, a portion of the third color filter disposed over the portion of the second color filter.

4. The display device of claim 3, wherein the first color filter comprises a red photoresist material, the second color filter comprises a green photoresist material, and the third color filter comprises a blue photoresist material.

5. The display device of claim 3, wherein the first color filter comprises a blue photoresist material, the second color filter comprises a green photoresist material, and the third color filter comprises a red photoresist material.

6. The display device of claim 1, wherein the black matrix material has an optical density greater than 2.0 at wavelengths of 550 nanometers to 650 nanometers and a combination of the portion of the first color filter and the portion of the second color filter has an optical density greater than 1.0 at wavelengths of 550 nanometers to 650 nanometers.

7. The display device of claim 1, wherein a combination of the black matrix material, the portion of the first color filter, and the portion of the second color filter has an optical density greater than 3.0.

8. The display device of claim 1, wherein the black matrix material has a reflectance less than 2.0%.

9. The display device of claim 1, wherein the black matrix material is positioned directly over a first pixel wall of the plurality of pixel walls, the display device further comprising a thin film transistor positioned between the first pixel wall and the bottom support plate.

10. The display device of claim 1, further comprising:
a planarization layer over the color filter layer;
a common electrode on the planarization layer; and
a first liquid and a second liquid that is immiscible with the first liquid, the first liquid and the second liquid arranged in the plurality of pixel regions.

11. The display device of claim 10, wherein the black matrix material is positioned directly over a first pixel wall of the plurality of pixel walls, the display device further comprising an electrode layer between the first pixel wall and the bottom support plate, the electrode layer coupled to the common electrode for creating, in conjunction with the common electrode, a voltage differential between the electrode layer and the common electrode to cause displacement of the first liquid within the pixel.

12. The display device of claim 1, wherein:
the first pixel region comprises a first plurality of pixel walls over the bottom support plate, the first plurality of pixel walls associated with a first pixel within the first pixel region,
the second pixel region comprises a second plurality of pixel walls over the bottom support plate, the second plurality of pixel walls associated with a second pixel within the second pixel region, and
the black matrix material is positioned directly over the first plurality of pixel walls associated with the first pixel and the second plurality of pixel walls associated with the second pixel.

13. The display device of claim 12, wherein the black matrix material forms a border around a first color filter of the plurality of color filters, and the first color filter is transparent to a first color of visible light.

14. The display device of claim 13, wherein the second color filter is transparent to a second color of visible light.

15. The display device of claim 14, wherein the plurality of color filters includes a third color filter positioned at least partly within a third pixel region of the plurality of pixel regions, a portion of the third color filter disposed over the portion of the second color filter.

16. A display device, comprising:
a bottom support plate and a top support plate opposite to the bottom support plate;
a plurality of pixel regions between the bottom support plate and the top support plate, the plurality of pixel regions including a first pixel region including a first pixel with a first plurality of pixel walls and a second pixel region adjacent to the first pixel region, the second pixel region including a second pixel with a second plurality of pixel walls; and
a color filter layer on a surface of the top support plate, the color filter layer comprising:
a black matrix material positioned directly over the first plurality of pixel walls and the second plurality of pixel walls;
a first color filter on the surface of the top support plate and associated with the first pixel, wherein a portion of the first color filter is positioned partly within the first pixel region and partly within the second pixel and is disposed over a first portion of the black matrix material and a first surface of the portion of the first color filter contacts the first portion of the black matrix material, the first color filter being transparent to a first color of visible light; and
a second color filter on the surface of the top support plate and associated with the second pixel, wherein a portion of the second color filter is positioned partly within the first pixel region and partly within the second pixel region and is disposed over the portion of the first color filter and a first surface of the portion of the second color filter contacts a second surface of the portion of the first color filter opposing the first surface of the portion of the first color filter, the second color filter being transparent to a second color of visible light.

17. The display device of claim 16, wherein the black matrix material has an optical density greater than 2.0 at wavelengths of 550 nanometers to 650 nanometers and a combination of the first color filter and the second color filter has an optical density greater than 1.0 at wavelengths of 550 nanometers to 650 nanometers.

18. The display device of claim 16, wherein the first color filter comprises a red photoresist material and the second color filter comprises a blue photoresist material.

19. The display device of claim 16, wherein the plurality of pixel regions includes a third pixel region including a third pixel, and a third color filter of the color filter layer is associated with the third pixel, a portion of the third color filter disposed over the portion of the second color filter.

20. The display device of claim 19, wherein the first color filter comprises a red photoresist material, the second color filter comprises a green photoresist material, and the third color filter comprises a blue photoresist material.

\* \* \* \* \*